US012731090B1

(12) United States Patent
Kulkarni et al.

(10) Patent No.: US 12,731,090 B1
(45) Date of Patent: Sep. 8, 2026

(54) EXPERT MATCHING USER INTERFACE

(71) Applicant: Intuit Inc., Mountain View, CA (US)

(72) Inventors: Devaki Kulkarni, Palo Alto, CA (US); Sanjeev Vemireddy, Mountain View, CA (US); Craig Adam Moll, Mountain View, CA (US); Yi Qun Zhou, Palo Alto, CA (US); Roumen Bogomilov Antonov, Irvine, CA (US); Sinu Sekhar, Austin, TX (US); Qingbo Hu, Burlingame, CA (US); Harshal Raut, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/281,463

(22) Filed: Jul. 25, 2025

(51) Int. Cl.
*G06Q 10/0631* (2023.01)
*G06F 9/451* (2018.01)

(52) U.S. Cl.
CPC ..... *G06Q 10/063112* (2013.01); *G06F 9/453* (2018.02)

(58) Field of Classification Search
CPC .............................................. G06Q 10/063112
See application file for complete search history.

(56) References Cited

U.S. PATENT DOCUMENTS

2022/0293107 A1* 9/2022 Leaman ............. G06Q 30/0271
2022/0343250 A1* 10/2022 Tremblay .............. G06F 3/0482
2024/0256792 A1* 8/2024 Maschmeyer .......... G06F 40/40
2024/0338710 A1* 10/2024 Mico .................... G06Q 30/015
2024/0395258 A1* 11/2024 Hiray ...................... G10L 15/04
2024/0403567 A1* 12/2024 Dressler, II ............. H04L 51/02
2025/0069114 A1* 2/2025 Lintz .................. G06Q 30/0251
2025/0094455 A1* 3/2025 Bista ................... G06F 16/3329
2025/0110957 A1* 4/2025 Baldua ................ G06F 16/2425
2025/0131023 A1* 4/2025 Shim ................... G06F 16/3334
2025/0156302 A1* 5/2025 Ostrowski ........... G06F 11/3438
2025/0156898 A1* 5/2025 Crabtree ............ G06Q 30/0277
2025/0217867 A1* 7/2025 Mallikarjunan ... G06Q 30/0641
2025/0219968 A1* 7/2025 Gong ..................... G06N 3/045

(Continued)

OTHER PUBLICATIONS

Ridwan, Ishola Bayo. “Transforming customer segmentation with unsupervised learning models and behavioral data in digital commerce.” International Journal of Research Publication and Reviews 6.5 (2025): 2232-2249. (Year: 2025).*

(Continued)

*Primary Examiner* — Andre D Boyce
(74) *Attorney, Agent, or Firm* — Lathrop GPM LLP

(57) ABSTRACT

An expert matching user interface includes tracking user interactions of a user in a workflow interface of an application to generate tracking data. The expert matching user interface further includes detecting an abandonment precursor with the tracking data, and determining, responsive to the abandonment precursor, that a user is matched to a personal expert. The user is matched to the personal expert persists across sessions between the user and the application. The expert matching user interface includes displaying, in the workflow interface, an expert icon specific to the personal expert matched to the user and a connection button, and connecting, upon selection of the connection button, the user to the personal expert through a communication interface within the workflow interface.

14 Claims, 7 Drawing Sheets

(56) References Cited

U.S. PATENT DOCUMENTS

| | | | | |
|---|---|---|---|---|
| 2025/0258653 | A1* | 8/2025 | Duggal | G06F 8/20 |
| 2025/0265298 | A1* | 8/2025 | Crabtree | G09B 21/00 |

OTHER PUBLICATIONS

Li, Yuanchun, and Oriana Riva. "Glider: A reinforcement learning approach to extract UI scripts from websites." Proceedings of the 44th International ACM SIGIR Conference on Research and Development in Information Retrieval. 2021. (Year: 2021).*

* cited by examiner

EXPERT MATCHING USER INTERFACE

BACKGROUND

Server side computing systems involve application servers providing various functionality to achieve a result for the user. With some applications, the correctness of the result may be important or even critical to the user. However, because of the degree of complexity when performing the functionality of the application or inherent in the result, users may not have confidence in the result being correct.

By way of an example, reporting applications that assist in the generation of government reports may have deleterious effects to the user if incorrect. Users may be subject to expensive fines, sanctions, or other negative effects if the government report is incorrect. In the example, a reporting application that assists in the generation, both has to be correct, as well as imbue confidence in the user that the report is correct for the user to continue to use the reporting application.

Instilling such confidence is a challenge when the application is a server side application that is, thereby, impersonal. To address the challenge, various software products have a chat window by which a user may talk with the agent. Because of the impersonal nature of the communication with the agent, the user may not have confidence that the agent is real or knowledgeable. Thus, a challenge exists in designing a user interface that instills confidence in the user.

SUMMARY

In general, in one aspect, one or more embodiments relate to a method that includes tracking user interactions of a user in a workflow interface of an application to generate tracking data. The method further includes detecting an abandonment precursor with the tracking data, and determining, responsive to the abandonment precursor, that a user is matched to a personal expert. The user is matched to the personal expert persists across sessions between the user and the application. The method includes displaying, in the workflow interface, an expert icon specific to the personal expert matched to the user and a connection button, and connecting, upon selection of the connection button, the user to the personal expert through a communication interface within the workflow interface.

In general, in one aspect, one or more embodiments relate to a system an application including a workflow interface and at least one computer processor for causing the computer system to perform operations. The operations include includes tracking user interactions of a user in a workflow interface of an application to generate tracking data. The operations further include detecting an abandonment precursor with the tracking data, and determining, responsive to the abandonment precursor, that a user is matched to a personal expert. The user is matched to the personal expert persists across sessions between the user and the application. The operations further include displaying, in the workflow interface, an expert icon specific to the personal expert matched to the user and a connection button, and connecting, upon selection of the connection button, the user to the personal expert through a communication interface within the workflow interface.

In general, in one aspect, one or more embodiments relate to a method that includes obtaining clickstream data defining user interactions of a user in a workflow interface of an application to generate tracking data. The operations further include processing the clickstream data with a large language model (LLM) copilot to guide the user through the workflow interface, detecting, by an abandonment detection model triggered by the LLM copilot, an abandonment precursor with the tracking data, and determining that a user is matched to a personal expert of a plurality of experts, wherein the user being matched to the personal expert persists across a plurality of sessions between the user and the application. The method further includes displaying, in the workflow interface, an expert icon specific to the personal expert matched to the user and a connection button and connecting, upon selection of the connection button, the user to the personal expert through a communication interface within the workflow interface.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

One or more embodiments are directed to an application that provides a user interface that is specifically designed to instill confidence in the user when performing operations. Instilling confidence includes two parts. In a first part, embodiments specifically match a personal expert to the user that is independent of the session and the workflow of the user. The personal expert of the user persists across sessions between the user and the application. Thus, the particular user is able to communicate (e.g., via chat, text, phone call, or video) directly with a single personal expert that is specific to the user. Having a single expert is not sufficient to instill confidence in the user without a corresponding user interface change. Thus, for the user interface, the matching personal expert has a unique corresponding expert icon that is specific to the expert. For example, the unique corresponding expert icon may be a picture of the personal expert. The expert icon may be consistently displayed across screens. In particular, the expert icon may be displayed as a round button in the graphical user interface. Because the expert icon is individualized and is consistently displayed, the user knows that the user is communicating with a real human that is known to the user. Namely, the expert icon represents a consistent presence whereby the user may obtain help using the application.

Figure 1:
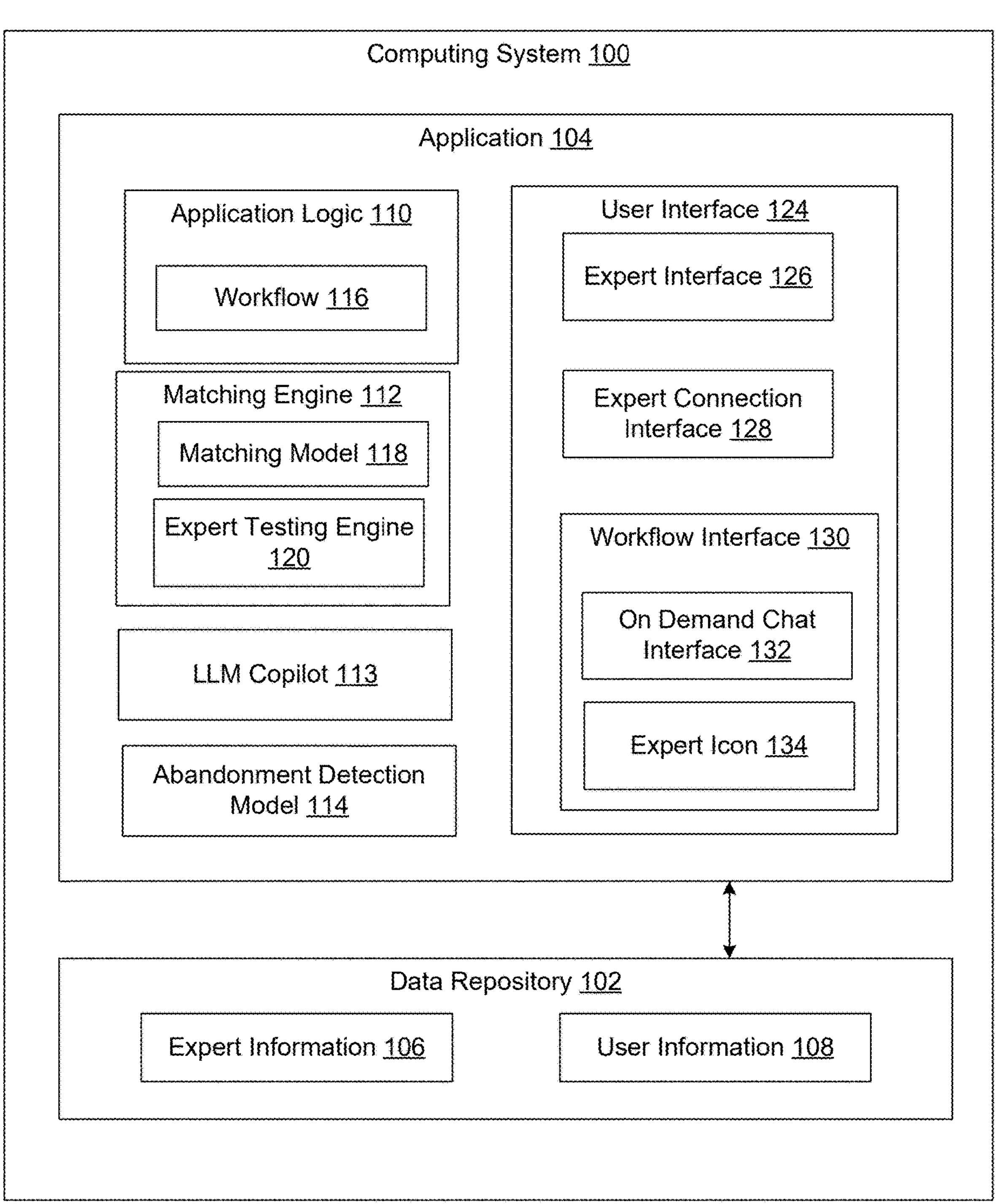
FIG. 1 shows a computing system, in accordance with one or more embodiments.

Attention is now turned to the figures. FIG. 1 shows a computing system (100) in accordance with one or more embodiments. The computing system (100) is an example of the computing system shown in FIG. 4A and FIG. 4B and described below.

The computing system (100) includes a data repository (102) and an application (104). The data repository (102) is a type of storage unit or device (e.g., a file system, database, data structure, or any other storage mechanism) for storing data. The data repository (102) may include multiple different, potentially heterogeneous, storage units and/or devices. The data repository (102) includes expert information (106) and user information (108).

The expert information (106) is information describing an expert. An expert is a human individual that is considered by the application to have knowledge of particular subject matter. Thus, the expert is an expert with respect to the particular subject matter. For example, the expert may select in a user interface, which subject matter the expert is knowledgeable. The expert may also provide credentials from third parties that are indicative of such knowledge. Further, in some embodiments, the application includes tests in various subject matters designed to indicate whether the human individual has knowledge of the subject matter. If the human individual passes the test, the human individual is deemed to have knowledge with respect to the subject matter.

The expert information (106) includes administrative information (e.g., one or more names or other identifiers, contact information, etc.) about the expert, one or more subject matter identifiers of subject matter in which the expert is deemed by the application an expert, availability information, number of current users connected to the expert, number of active connections, credential identifiers of credentials in which the expert is deemed an expert, and other such information. The availability information may be a meeting calendar showing unavailable and available times. The availability information may also include business hours in which the expert is generally available.

The user information (108) is information about a particular user. For example, the user information (108) may include administrative information about the user (e.g., identifier, geographic location, organization, position of user with respect to the organization, application version), organization information as related to the usage level of the user with respect to the application, workflow of the user, a list of functions that the user has performed in the past, with the tracking information describing the current workflow, and other information about the user. The tracking information may include processed or raw clickstream data.

The data repository (102) is connected to the application (104). The application (104) includes application logic (110), matching engine (112), large language model (LLM) copilot (113), abandonment detection model (114), and a user interface (124). The application logic (110) is the logic that provides the functionality of the application. The application logic (110) includes the background software code that performs the respective functions of the application. The application logic (110) may include one or more workflows (116). A workflow (116) is a guided path through the application. In a workflow, the information requested may be presented sequentially in an effort to ensure that all information is received by the application. In some cases, a workflow has multiple paths, whereby the input received along the workflow is used to determine a branch of multiple branches to take along the path. Each workflow may be configured to provide different functionality in the system. For example, each workflow may be for a different report generation.

The matching engine (112) is configured to match an expert to a user. The matching engine performs the matching based on the credentials and availability of the expert along with the attributes of the user. The matching engine (112) includes a matching model (118) and an expert testing engine (120). The matching model (118) is configured to match the expert to the user. The matching model (118) may be a machine learning model that is configured to perform the matching process. For example, the matching model may be a reinforcement learning model that matches based on the expert information (106) and the user interface (108). With reinforcement learning, the matching model improves over time based on user feedback regarding the expert being matched. The expert testing engine (120) is configured to administer a test to the expert to test the credentials of the expert.

The LLM copilot (113) is configured to receive and continuously process tracking data. For example, the tracking data may include clickstream data or data values filled into particular fields, the length of time that the user is submitting information into each field, etc. The LLM copilot (113) gathers the tracking data, generates a prompt with an LLM agent, and initiates an integrated or external LLM with the prompt to generate a recommendation to the user that includes an instruction or information to submit. The LLM copilot (113) is further configured to trigger the abandonment detection model (114). The abandonment detection model (114) is configured to detect possible abandonment of the application of the user.

The application (104) includes a user interface (122). The user interface (124) is a graphical user interface (GUI) that is configured to interact with the user and the expert. The user interface (124) includes an expert interface (126), an expert connection interface (128), and a workflow interface (130). The expert interface (126) is an interface for the expert. In particular, the expert interface (126) may be configured to test the expert and receive input from the expert. The expert interface (126) may also include a connection window that is configured to connect to the user.

The expert connection interface (128) is configured to receive information from a user to connect to the expert. The expert connection interface (128) may include one or more GUI widgets for the user to specify requirements for matching an expert. For example, the GUI widgets may be radio buttons or an expert connection interface (128).

The workflow interface (130) is configured to guide the user through the one or more workflows (116) to enter data into the application (104). The workflow interface (130) includes an on demand chat interface (132) and an expert icon (134). The on demand chat interface (132) is an interface that is configured to manage the network connection between the user and the expert. For example, the on demand chat interface (132) is configured to instantiate, upon the request from a user, a connection with an expert, receive messages from the user, transmit the messages to the expert, and display received messages from the expert. The expert icon (134) is a graphical user interface widget that represents and is specific to a particular expert. For example, the expert icon (134) may be a picture of the expert that is displayed in the graphical user interface.

While FIG. 1 shows a configuration of components, other configurations may be used without departing from the scope of one or more embodiments. For example, various components may be combined to create a single component. As another example, the functionality performed by a single component may be performed by two or more components.

Figure 2:
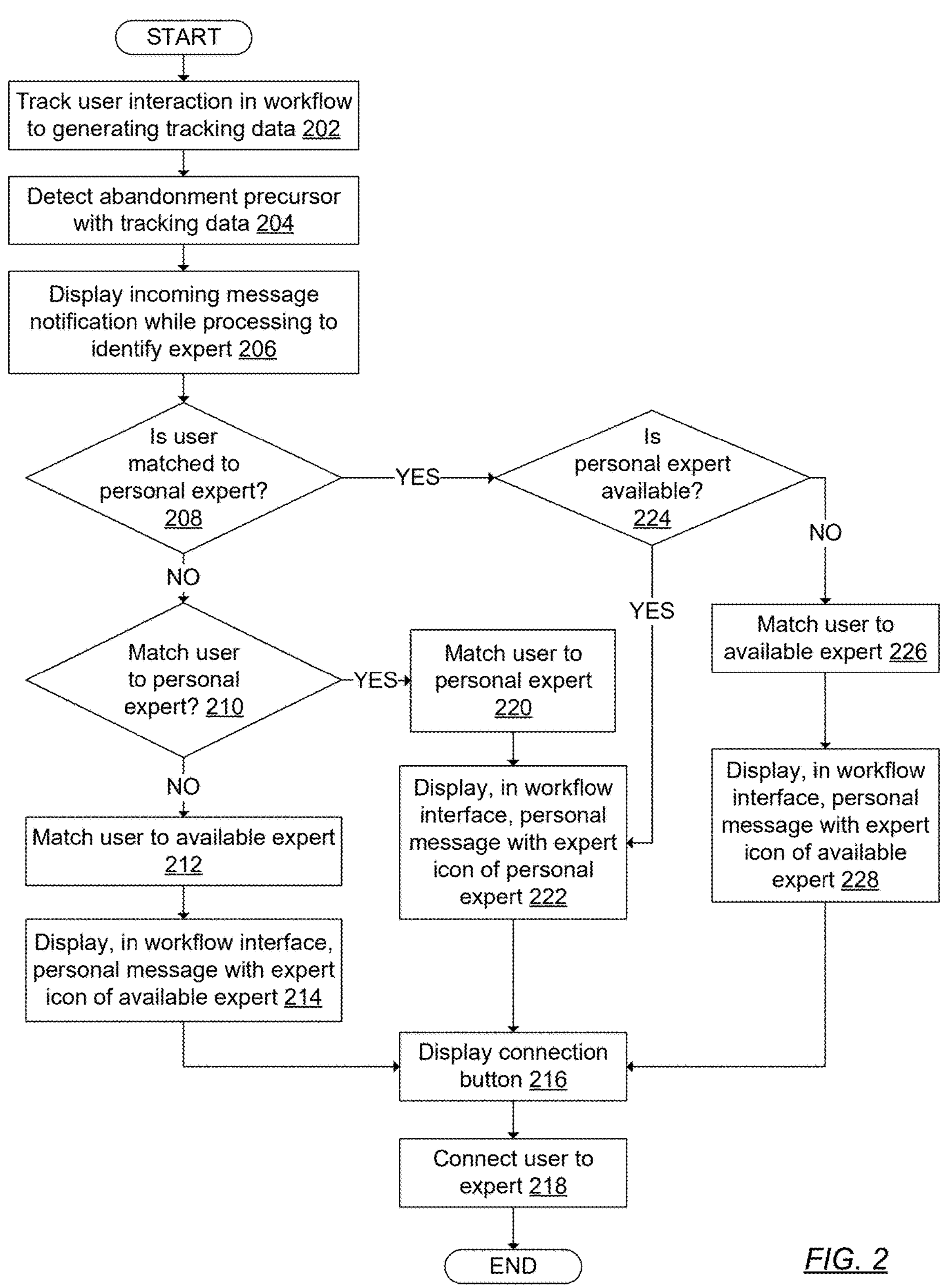
FIG. 2 shows a flowchart, in accordance with one or more embodiments.

FIG. 2 shows a flowchart in accordance with one or more embodiments. The method of FIG. 2 may be implemented using the system of FIG. 1 and one or more of the steps may be performed on or received at one or more computer processors. While the various steps in this flowchart are presented and described sequentially, at least some of the steps may be executed in different orders, may be combined or omitted, and at least some of the steps may be executed in parallel. Furthermore, the steps may be performed actively or passively.

Block 202 includes tracking user interactions in a workflow to generate tracking data. The user may initiate the workflow in the application by selecting a user interface button within the user interface of the application. Responsive to the selection, the application triggers the workflow interface. As the user interacts with the workflow interface, the user interactions are tracked. The tracking includes determining an amount of time that the user is on each screen of the workflow interface, the values that the user submits to various GUI widgets within the screen, whether the user modifies the values multiple times, whether the user revisits a screen and the screen identifier of the screen revisited, the frequency with which the user is using help files, and other information. The tracking is logged as tracking information in a log file.

Block 204 includes detecting an abandonment precursor with the tracking data. Detecting the abandonment precursor may be performed by continuously passing the tracking data through one or more machine learning models. For example, the persistent LLM copilot is a dynamic, "always on," LLM-based assistant that proactively suggests helpful tips on how to proceed on each screen. Specifically, the LLM copilot uses clickstream data to guide the user through the workflow interface. The LLM copilot receives and continually processes the tracking information, placing more weight on the more recent tracking data over previous tracking data. To use the persistent LLM copilot, the workflow interface includes an LLM agent that generates a prompt with the tracking information. The workflow agent may also provide the screen identifiers of the screen in the workflow. The persistent LLM copilot reactively adjusts suggestions if errors exist in the values on the screen, in which the user is currently submitting data, or inconsistencies exists between the values currently being entered and values in prior screens. The LLM copilot may be connected to the abandonment detection module that outputs a code when the abandonment precursor is detected. Upon the abandonment precursor detection, an entry point for connecting with an expert is triggered.

The LLM copilot processes the tracking data through the abandonment detection model. The abandonment detection model predicts the probability of conversion with intervention subtracted by the probability of conversion without intervention. Conversion is that the user continues to use the application to complete of the workflow. No conversion is an abandonment of the application without completing the workflow. The difference in probabilities is an objective function. The predictions use features like the number of clicks, the number of back and forth on certain pages, dwell time, errors faced, unresolved errors, and other features that is in the tracking data. When the difference is greater than a threshold, then the abandonment precursor is detected.

Block 206 includes displaying an incoming message notification while processing to identify an expert. The incoming message notification simulates when an incoming text message is being received to give a user the impression that the user will be connecting with an expert. For example, the incoming message notification may be an animated widget of dots with a message that an "incoming message" is being received. During the incoming message notification, the following processing is performed.

Block 208 includes determining whether a user is matched to a personal expert. Experts that the user is matched to persist across sessions. Thus, determining whether the user is matched to a personal expert includes determining from the user information an expert identifier of the matched expert. If the expert identifier exists in the user information, then the expert identifier is used to identify the particular expert. If no such expert identifier exists, then the user is detected as not being matched to an expert.

Block 210 includes, if the user is not matched to a personal expert, determining whether to match the user to a personal expert. The determination may be based on a configuration of the user and the workflow.

Block 212 includes, if the determination is made not to match the user to the personal expert, then the user is matched to an available expert. The application gathers availability information for each expert and determines the next available expert. Filtering may be applied to remove experts that do not have expertise in the user's current workflow or based on particular attributes of the user. For example, geographic location information may be used to filter the experts. From the remaining experts, the next available expert is selected. In some embodiments, a goal is that the next available expert is less than one minute. The next available expert becomes a match expert to the user because, for the purposes of the current session, the user is matched to the next available expert.

The matching engine extracts expert features from the expert information (e.g., expert's expertise and credibility as defined by the expert credentials, similarity of other users to each expert, and availability of the expert). The matching model further extracts user features from the customer information and the workflow of the customer. The LLM copilot or another component of the system may be queried by the matching engine to identify topic areas in which the customer has previously requested information or has been incorrect. The matching engine may then process the expert features and the user features through layers of the reinforcement learning matching model. Specifically, the reinforcement learning matching model processes the expert features and the user features through the layers of the reinforcement learning matching model to obtain a score for the user and each of the experts. By way of a more specific example, the reinforcement learning matching model may be a twin tower model that encodes the expert features through an expert side of the twin tower model and a user side of twin tower model, to obtain an expert vector and a user vector. The user vector and expert vector may be concatenated together and processed through neural network layer to obtain a score. Based on the score being optimal for the personal expert, the user is matched to the personal expert. The processing of the expert side may be performed for each expert and stored to obtain the expert vector for the expert.

Over time, for several matches, user feedback from the user regarding the personal expert may be received. A loss is calculated with a loss function processing the user feedback. The loss is backpropagated through the reinforcement learning matching model to update the reinforcement learning matching model.

Block 214 includes displaying, in a workflow interface, a personal message with the expert icon of the available expert. The personal message is an initial message to the user that is selected based on attributes of the user. The personal message presents a reason for the user to connect to the expert based on attributes of the user as well as suggest that the user meet with an expert. To select the personal message, attributes of the user along with a current screen within the workflow are input to a table to lookup the corresponding personal message. In other embodiments, the LLM copilot may generate a personal message.

Block 216 includes displaying a connection button. The connection button may be the expert icon or GUI button next to the expert icon. The connection button includes a communication mode for connecting with the match expert. When the user selects the connection button, the system may proceed to initiate a new connection between the user and the match expert.

Block 218 includes connecting the user to the match expert. A new communication channel is created between the user and the match expert. For example, the new communication channel may be a chat interface. On the expert side, the user interface includes the same personal message that was displayed in Block 214. Thus, the expert is able to see the current message (i.e., the personal message) being displayed and continue the communication from the personal message without appearing interrupted.

Returning to Block 210, if the determination is made to match the user to the personal expert, Block 220 includes matching the user to the personal expert. The user is matched to a personal expert based on attributes of the user as well as match criteria that is provided by the user. For example, the user may specify criteria for matching to an expert. The criteria may include particular subject matter for the expert that the user requires, skills of the expert, cost requirements for the expert, general availability of the expert over time, immediate availability of the expert, and other information that can be used to select the expert. The criteria are compared to the expert information.

When an expert is onboarded, the proficiency level of the expert is assessed. The expert submits in an expert interface, the expert's subject matter of expertise and any third party provided credentials supporting that assertion. The application may also test the expert to confirm the expert's asserted proficiency. The combination of the expert's assertions and the test results are combined into one or more expert scores in various subject matter areas. The expert scores form the credentials of the expert in the expert information. The credentials may be defined in broader categories than the criteria specified by the user.

A match score is calculated for each expert using the credentials and criteria. The match score is a combination of the degree to which the credentials match the criteria and the availability of the expert.

Block 222 includes displaying, in the workflow interface, a personal message with an expert icon of the personal expert. Selecting and displaying the personal message may be performed as described above in reference to Block 214. However, with the personal message, the expert icon of the personal expert is displayed. By displaying the expert icon of the matched expert and having the match expert appearing across sessions, the user has a trusted contact and is more likely to continue to use the application.

Block 216 includes displaying a connection button as described above. When the connection button is selected, Block 218 is performed to connect the user to the personal expert.

Returning to Block 208, if the user is matched to a personal expert, then Block 224 includes determining whether the personal expert is available. When a user is matched to a personal expert, the threshold for the availability of the personal expert may be different than the threshold for the availability of a non-matched expert. For example, a non-matched expert may be deemed available if the user can connect to the non-matched expert within a few minutes or even hours. Conversely, the personal expert may be deemed available if the user can connect to the personal expert within a day or two. The threshold for the availability of the personal expert may be dependent on any deadline for the user to complete the task of the workflow as determined by the application. For example, if the deadline is within three days and the personal expert is only available after one day, then the personal expert may be deemed unavailable. Otherwise, the personal expert may be deemed available.

If the personal expert is available, Block 222 includes displaying the expert icon of the personal expert as described above. Block 216 includes displaying a connection button as described above. When the connection button is selected, Block 218 is performed to connect the user to the personal expert.

Returning to Block 224, if the personal expert is not available, Block 226 includes matching the user to an available expert. Further, Block 228 includes displaying, in the workflow interface, the personal message with the expert icon of the available expert. Block 226 and Block 228 may be performed as described above with reference to Block 212 and Block 214. The connection button is displayed in Block 216. Further, the user is connected to the available expert as described in Block 218.

Figure 3A:
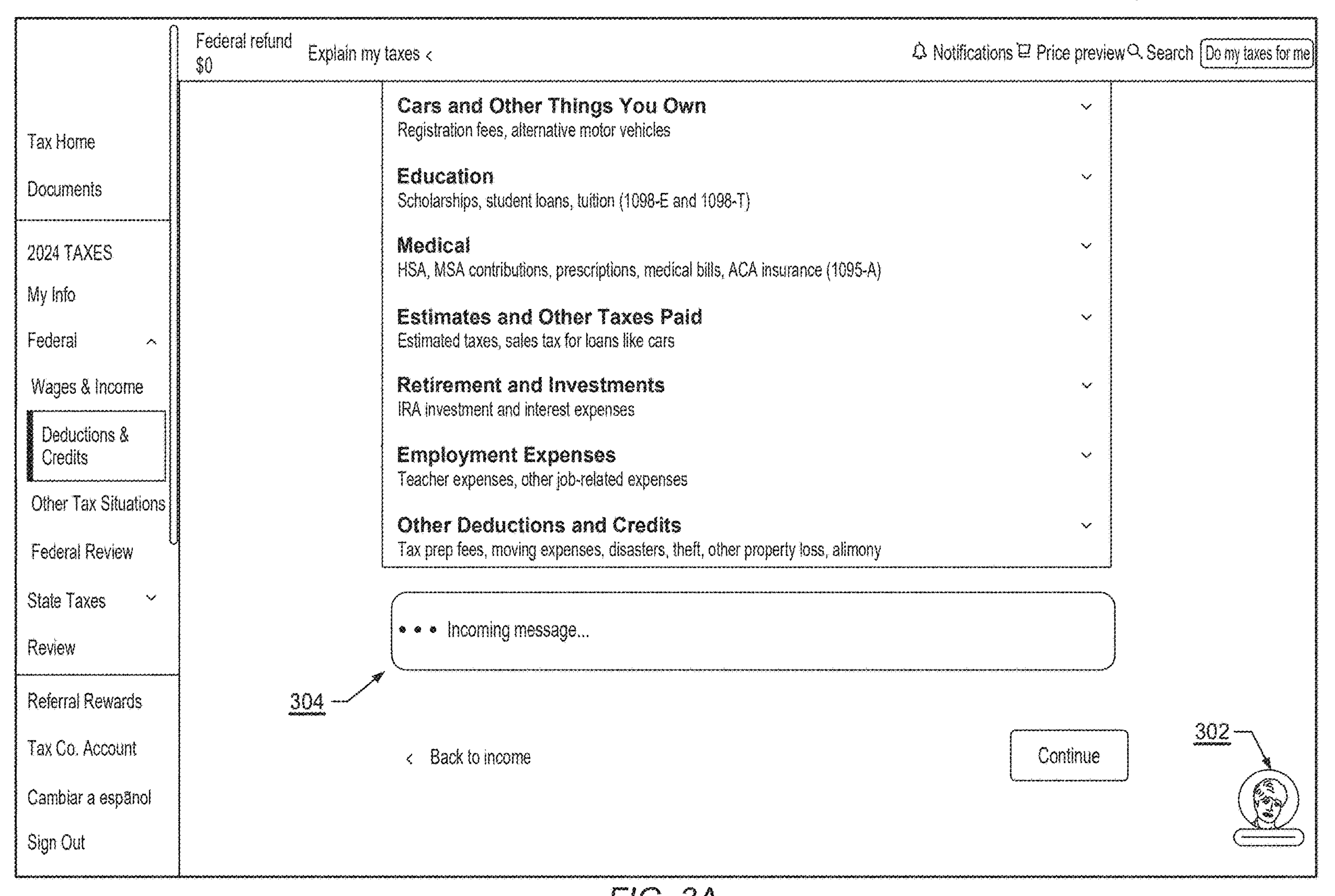
FIG. 3A, FIG. 3B, FIG. 3C, and FIG. 3D show an example, in accordance with one or more embodiments.

FIG. 3A shows an example workflow interface (300) in one or more embodiments. The expert icon (302) is displayed of the user's personal expert. Thus, the user is generally provided with the option of contacting the personal expert when the user would like to connect to the personal expert. Concurrently, consider the scenario in which the application detects the abandonment precursor with tracking data. For example, the user may be on the screen for more than a threshold period of time. Responsive to the abandonment precursor, the incoming message notification (304) is displayed. At this stage, the application has not connected to an expert.

Figure 3B:
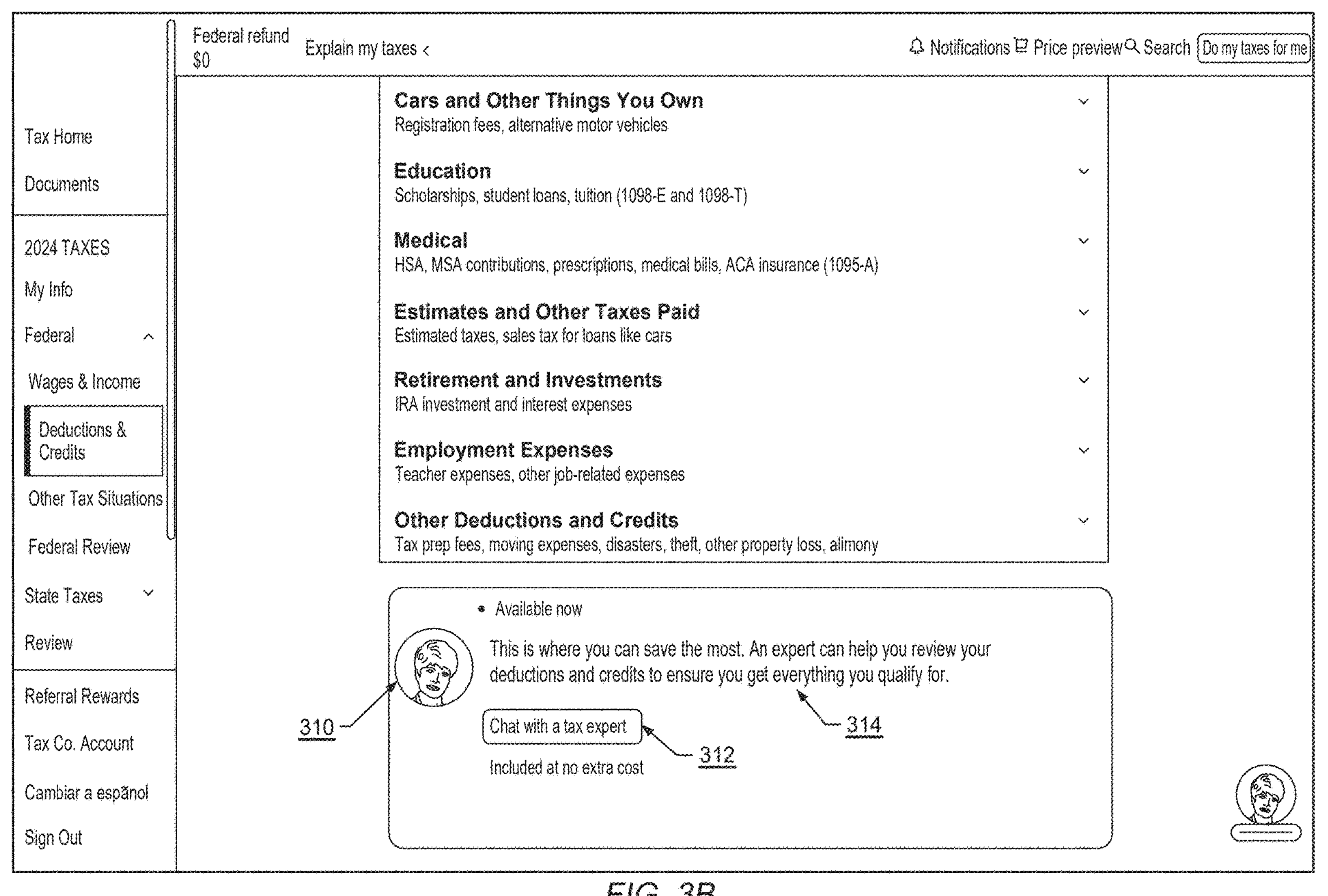

Continuing with the example of the workflow interface (300) in FIG. 3B, the user is determined to be matched to the personal expert and the personal expert is available. Responsive to the availability, a personal message (314) is displayed to the user with the expert icon (310) of the user personal expert. Further, a connection button (312) is displayed. Because the length of time for the connection is less than a few minutes, the connection button (312) indicates that the user may chat with the expert. However, if the length of time is longer, then the connection button may be to arrange an appointment with the expert.

Figure 3C:
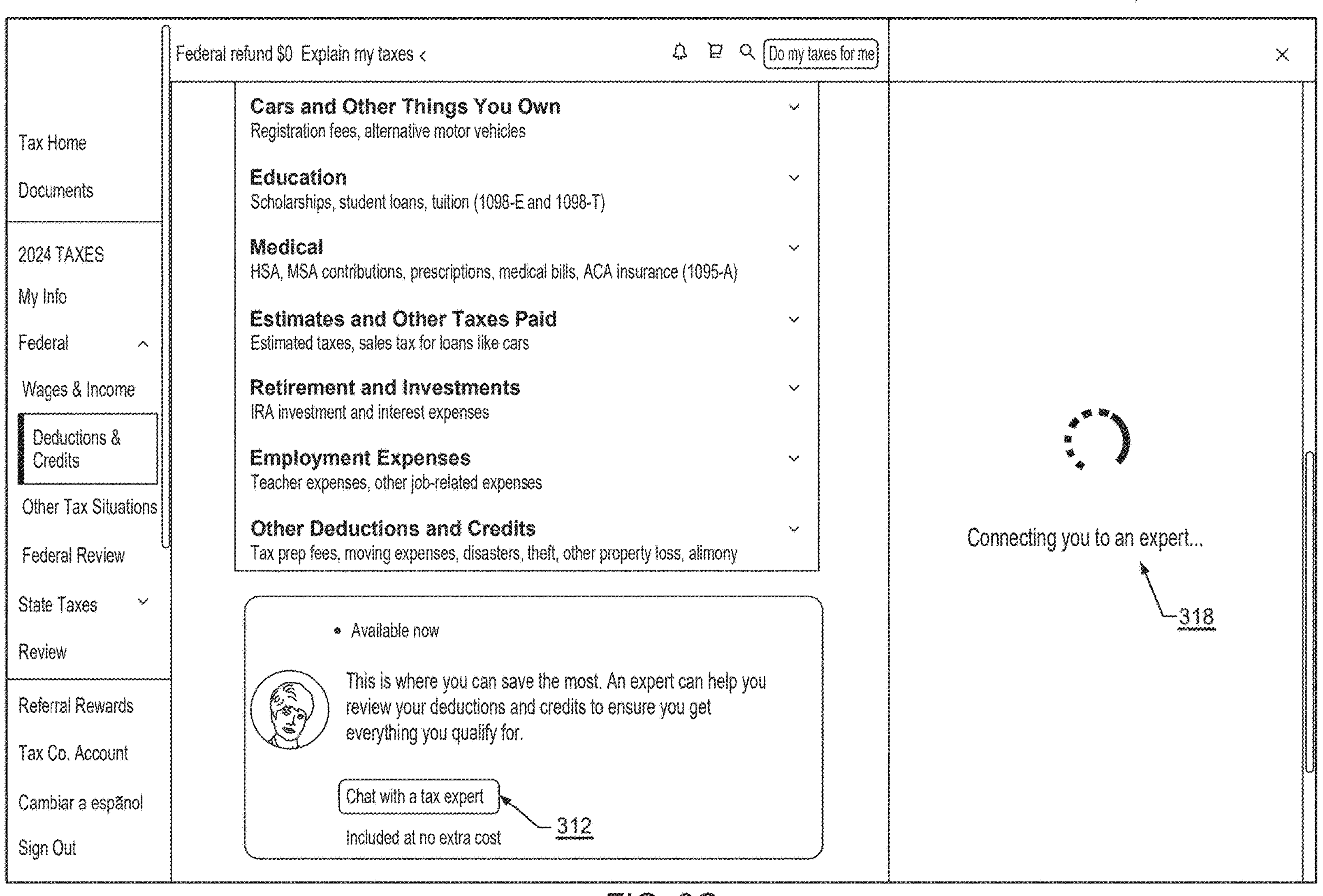
Figure 3D:
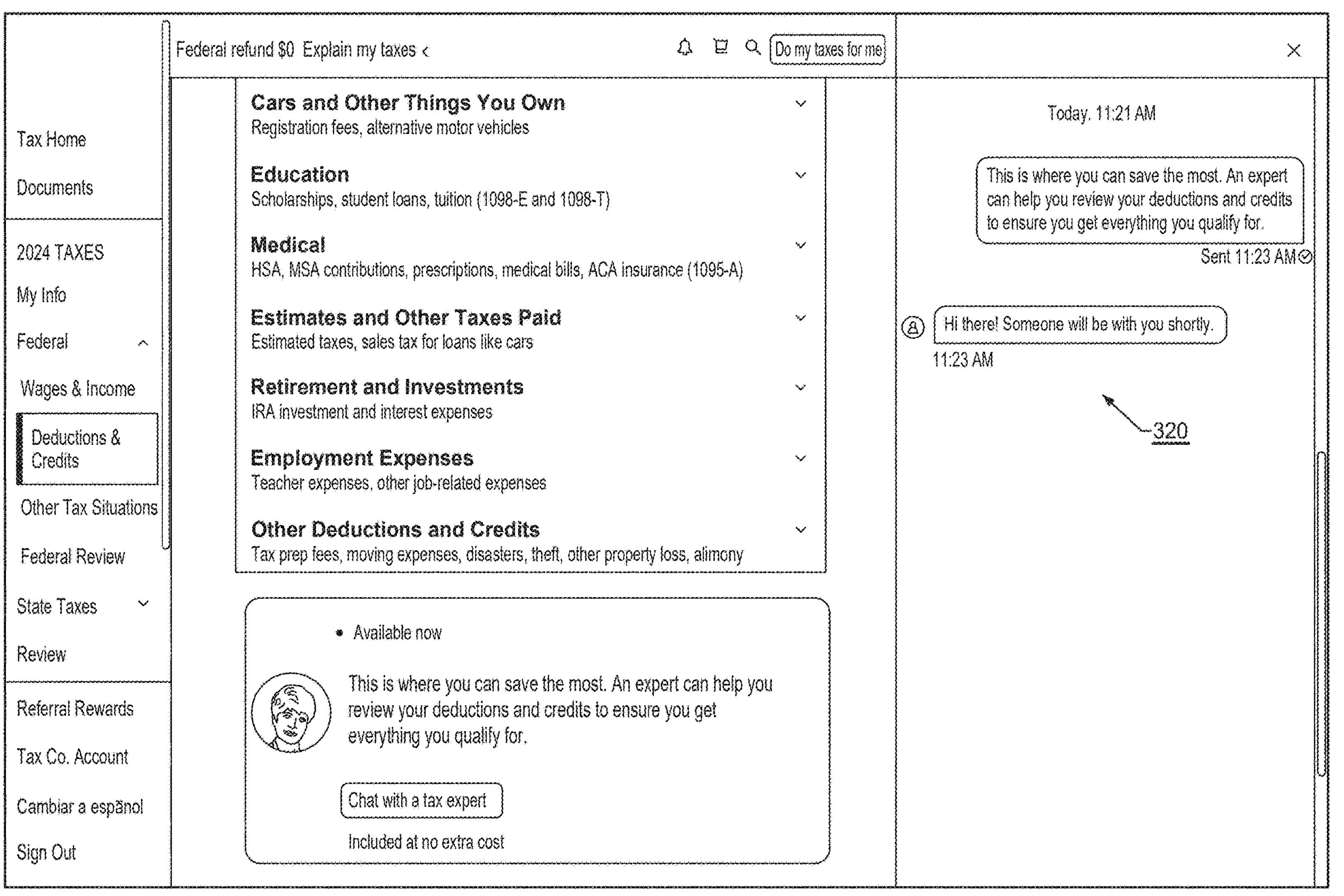

If the user selects the connection button (312), in FIG. 3C, the workflow interface (300) user is connected to the personal expert. An animation (318) may be displayed to indicate that the user is in the process of being connected. Once connected, as shown in pane (320) of the workflow interface (300) of FIG. 3D, the user is able to chat with the expert. By having personal experts and detecting when the user abandonment may occur, embodiments address the inherent problem of impersonal server applications through the user interface.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 4A:
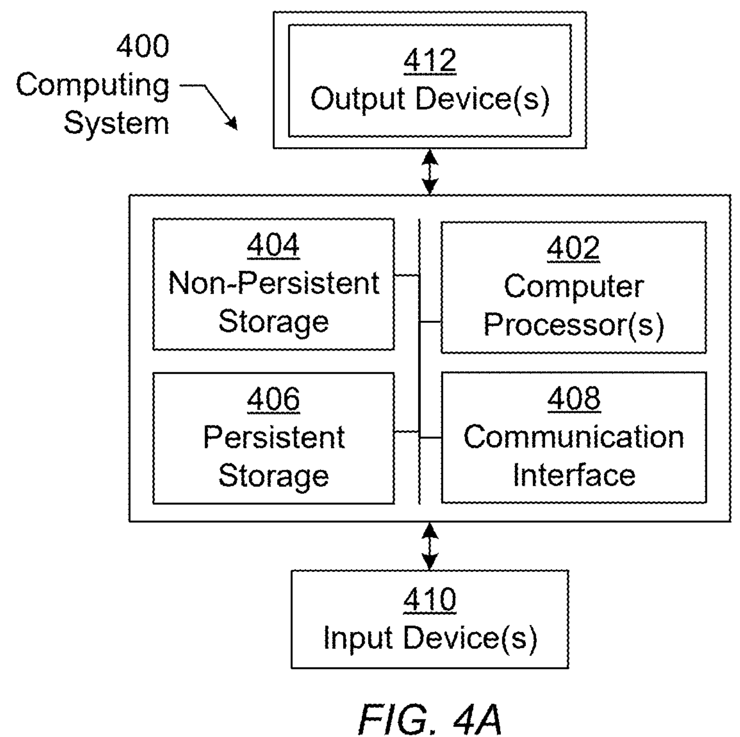
FIG. 4A and FIG. 4B show a computing system, in accordance with one or more embodiments.

For example, as shown in FIG. 4A, the computing system (400) may include one or more computer processor(s) (402), non-persistent storage device(s) (404), persistent storage device(s) (406), a communication interface (408) (e.g., Bluetooth interface, infrared interface, network interface, optical interface, etc.), and numerous other elements and functionalities that implement the features and elements of the disclosure. The computer processor(s) (402) may be an integrated circuit for processing instructions. The computer processor(s) (402) may be one or more cores, or micro-cores, of a processor. The computer processor(s) (402) includes one or more processors. The computer processor(s) (402) may include a central processing unit (CPU), a graphics processing unit (GPU), a tensor processing unit (TPU), combinations thereof, etc.

The input device(s) (410) may include a touchscreen, keyboard, mouse, microphone, touchpad, electronic pen, or any other type of input device. The input device(s) (410) may receive inputs from a user that are responsive to data and messages presented by the output device(s) (412). The inputs may include text input, audio input, video input, etc., which may be processed and transmitted by the computing system (400) in accordance with one or more embodiments. The communication interface (408) may include an integrated circuit for connecting the computing system (400) to a network (not shown) (e.g., a local area network (LAN), a wide area network (WAN) such as the Internet, mobile network, or any other type of network) or to another device, such as another computing device, and combinations thereof.

Further, the output device(s) (412) may include a display device, a printer, external storage, or any other output device. One or more of the output device(s) (412) may be the same or different from the input device(s) (410). The input device(s) (410) and output device(s) (412) may be locally or remotely connected to the computer processor(s) (402). Many different types of computing systems exist, and the aforementioned input device(s) (410) and output device(s) (412) may take other forms. The output device(s) (412) may display data and messages that are transmitted and received by the computing system (400). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (402), is configured to perform one or more embodiments, which may include transmitting, receiving, presenting, and displaying data and messages described in the other figures of the disclosure.

Figure 4B:
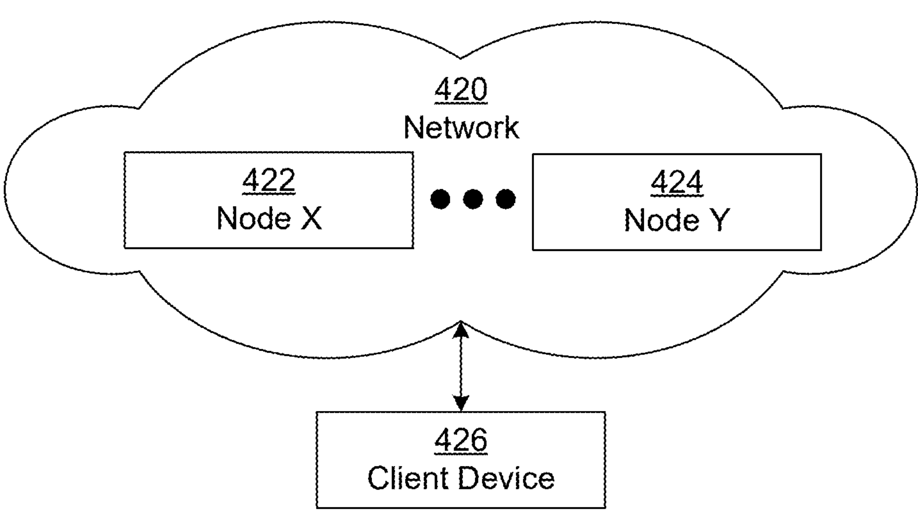

The computing system (400) in FIG. 4A may be connected to, or be a part of, a network. For example, as shown in FIG. 4B, the network (420) may include multiple nodes (e.g., node X (422) and node Y (424), as well as extant intervening nodes between node X (422) and node Y (424)). Each node may correspond to a computing system, such as the computing system shown in FIG. 4A, or a group of nodes combined may correspond to the computing system shown in FIG. 4A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

The nodes (e.g., node X (422) and node Y (424)) in the network (420) may be configured to provide services for a client device (426). The services may include receiving requests and transmitting responses to the client device (426). For example, the nodes may be part of a cloud computing system. The client device (426) may be a computing system, such as the computing system shown in FIG. 4A. Further, the client device (426) may include or perform all or a portion of one or more embodiments.

The computing system of FIG. 4A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

tracking, by a computer processor, a plurality of user interactions of a user in a workflow interface of an application to generate tracking data;

detecting, by the computer processor, an abandonment precursor with the tracking data;

matching, by the computer processor and responsive to detecting the abandonment precursor, the user to a selected personal expert of a plurality of experts by performing operations comprising:

extracting a plurality of expert features from a plurality of sets of information, wherein each of the plurality of sets of information describes one of the plurality of experts, encoding, for each of the plurality of experts, the plurality of expert features using an expert side of a twin tower reinforcement machine learning model to generate a plurality of expert vectors, wherein each expert vector of the plurality of expert vectors describes one of the plurality of experts, extracting a plurality of user features from user information describing the user, encoding the plurality of user features using a user side of the twin tower reinforcement machine learning model to generate a user vector, generating a plurality of input vectors by concatenating each of the plurality of expert vectors with the user vector, processing the plurality of input vectors through a neural network layer of the twin tower reinforcement machine learning model to generate a plurality of scores, and matching the user to the selected personal expert based on the plurality of scores;

persisting the user to the selected personal expert across a plurality of sessions between the user and the application;

displaying, in the workflow interface, an expert icon specific to the selected personal expert matched to the user and a connection button; and connecting, upon selection of the connection button, the user to the selected personal expert through a communication interface within the workflow interface.

2. The method of claim 1, further comprising:

displaying, on a display device, an incoming message notification to identify an expert, wherein the incoming message notification shows dots followed by a message that an incoming message is being received, and wherein the incoming message notification is displayed prior to connecting the user to the selected personal expert and after detecting the abandonment precursor.

3. The method of claim 1, further comprising:

determining, by the computer processor, an availability of the selected personal expert of the user; and matching, by the computer processor, the user to another of the plurality of experts, other than the selected personal expert, responsive to determining that the selected personal expert is unavailable.

4. The method of claim 1, further comprising:

displaying, on a display device, an expert icon of the selected personal expert throughout the workflow interface;

receiving, by the computer processor, a selection, in the workflow interface, of the expert icon; and connecting, by the computer processor and responsive to selection of the expert icon, the user to the selected personal expert.

5. The method of claim 1, further comprising:

selecting, by the computer processor and from a plurality of messages, a personal message specific to the user based on at least one attribute of the user; and prior to connecting the user to the selected personal expert, displaying, by the computer processor, the personal message to the user.

6. The method of claim 1, further comprising:

predicting, by the computer processor and with the tracking data, a probability of conversion with intervention and a probability of conversion without intervention;

determining, by the computer processor, a difference between the probability of conversion with intervention and the probability of conversion without intervention; and detecting, by the computer processor, the abandonment precursor when the difference is greater than a threshold.

7. The method of claim 1, further comprising:

receiving, by the computer processor, user feedback from the user regarding the selected personal expert;

generating, by the computer processor, a loss based on the user feedback; and backpropagating, by the computer processor, the loss through the twin tower reinforcement learning machine learning model to update the twin tower reinforcement learning machine learning model.

8. A system comprising:

an application comprising a workflow interface; and at least one computer processor for executing computer readable program code to perform operations comprising:

tracking a plurality of user interactions of a user in the workflow interface of the application to generate tracking data;

detecting an abandonment precursor with the tracking data;

matching, responsive to detecting the abandonment precursor, the user to a selected personal expert of a plurality of experts by performing operations comprising:

extracting a plurality of expert features from a plurality of sets of information, wherein each of the plurality of sets of information describes one of the plurality of experts, encoding, for each of the plurality of experts, the plurality of expert features using an expert side of a twin tower reinforcement machine learning model to generate a plurality of expert vectors, wherein each of the plurality of expert vectors describes one of the plurality of experts, extracting a plurality of user features from user information describing the user, encoding the plurality of user features using a user side of the twin tower reinforcement machine learning model to generate a user vector, generating a plurality of input vectors by concatenating each of the plurality of expert vectors with the user vector, processing the plurality of input vectors through a neural network layer of the twin tower reinforcement machine learning model to generate a plurality of scores, and matching the user to the selected personal expert based on the plurality of scores;

persisting the user to the selected personal expert across a plurality of sessions between the user and the application;

displaying, in the workflow interface, an expert icon specific to the selected personal expert matched to the user and a connection button; and connecting, upon selection of the connection button, the user to the selected personal expert through a communication interface within the workflow interface.

9. The system of claim 8, wherein the operations further comprise:

displaying an incoming message notification to identify an expert, wherein the incoming message notification shows dots followed by a message that an incoming message is being received, and wherein the incoming message notification is displayed prior to connecting the user to the selected personal expert after detecting the abandonment precursor.

10. The system of claim 8, wherein the operations further comprise:

determining an availability of the selected personal expert of the user; and matching the user to another of the plurality of experts, other than the selected personal expert, responsive to determining that the selected personal expert is unavailable.

11. The system of claim 8, wherein the operations further comprise:

displaying an expert icon of the selected personal expert throughout the workflow interface;

receiving a selection, in the workflow interface, of the expert icon; and connecting, responsive to selection of the expert icon, the user to the selected personal expert.

12. The system of claim 8, wherein the operations further comprise:

selecting, from a plurality of messages, a personal message specific to the user based on at least one attribute of the user; and prior to connecting the user to the selected personal expert, displaying the personal message to the user.

13. The system of claim 8, wherein the operations further comprise:

predicting, with the tracking data, a probability of conversion with intervention and a probability of conversion without intervention;

determining a difference between the probability of conversion with intervention and the probability of conversion without intervention; and detecting the abandonment precursor when the difference is greater than a threshold.

14. The system of claim 8, wherein the operations further comprise:

receiving user feedback from the user regarding the selected personal expert;

generating a loss based on the user feedback; and backpropagating the loss through the twin tower reinforcement learning machine learning model to update the twin tower reinforcement learning machine learning model.

* * * * *